United States Patent [19]

Reimschuessel et al.

[11] Patent Number: 4,736,006

[45] Date of Patent: Apr. 5, 1988

[54] TERPOLYMERS OF CHLOROTRIFLUOROETHYLENE, OR TETRAFLUOROETHYLENE, ETHYLENE AND PERFLUOROISOALKOXY PERFLUOROALKYL ETHYLENES

[75] Inventors: Herbert K. Reimschuessel, Morristown; Forrest J. Rahl, Hackettstown; Harry E. Ulmer, Morristown, all of N.J.

[73] Assignee: Ausimont, U.S.A., Inc., Morristown, N.J.

[21] Appl. No.: 866,982

[22] Filed: May 14, 1986

Related U.S. Application Data

[63] Continuation of Ser. No. 683,459, Dec. 19, 1984, abandoned.

[51] Int. Cl.$^4$ ............................................. C08F 16/24
[52] U.S. Cl. ................................................. 526/247
[58] Field of Search ....................................... 526/247

[56] References Cited

U.S. PATENT DOCUMENTS

| | | |
|---|---|---|
| Re. 28,628 | 11/1975 | Carlson et al. ............ 526/247 |
| 3,624,250 | 11/1971 | Carbon . |
| 3,642,742 | 2/1972 | Carlson . |
| 3,706,723 | 12/1972 | Chandrasekaran et al. . |
| 3,738,923 | 6/1973 | Carlson et al. . |
| 3,847,881 | 11/1974 | Mueller et al. . |
| 3,859,262 | 1/1975 | Hartwimmer . |
| 3,893,987 | 7/1975 | Chandrasekaran . |
| 4,123,602 | 10/1978 | Ukihashi et al. . |
| 4,255,299 | 3/1981 | Daimon et al. . |
| 4,434,273 | 2/1984 | Uschold . |
| 4,499,249 | 2/1985 | Nakagawa et al. . |
| 4,500,739 | 2/1985 | Caporiccio et al. . |
| 4,510,300 | 4/1985 | Levy .................... 526/247 |
| 4,510,301 | 4/1985 | Levy .................... 526/247 |
| 4,513,129 | 4/1985 | Nakagawa et al. . |
| 4,521,575 | 6/1985 | Nakagawa et al. . |
| 4,546,157 | 10/1985 | Nakagawa et al. ......... 526/247 |
| 4,568,773 | 2/1986 | Ohmori et al. ........... 526/247 |
| 4,569,962 | 2/1986 | Biguette et al. .......... 526/247 |
| 4,576,752 | 3/1986 | Krespan . |
| 4,577,044 | 3/1986 | Campbell et al. . |
| 4,638,041 | 1/1987 | Ohmori et al. ........... 526/247 |

FOREIGN PATENT DOCUMENTS 2084593  4/1982  United Kingdom .

*Primary Examiner*—Joseph L. Schofer
*Assistant Examiner*—N. Sarofin
*Attorney, Agent, or Firm*—John G. Gilfillan, III; Elliot M. Olstein; Raymond J. Lillie

[57] ABSTRACT

This invention relates to terpolymers of chlorotrifluoroethylene, ethylene and perfluoroalkoxyperfluoroalkyl ethylene which have improved resistance to thermal stress cracking and improved high temperature properties.

21 Claims, No Drawings

TERPOLYMERS OF CHLOROTRIFLUOROETHYLENE, OR TETRAFLUOROETHYLENE, ETHYLENE AND PERFLUOROISOALKOXY PERFLUOROALKYL ETHYLENES

This application is a continuation of application Ser. No. 683,459 filed Dec. 19, 1984, now abandoned.

BACKGROUND OF THE INVENTION

(1) Field of the Invention

This invention relates to terpolymers of chlorotrifluoroethylene or tetrafluoroethylene, ethylene and perfluoroisoalkyloxy perfluoroalkyl ethylene. More particularly, this invention relates to such terpolymers having improved high temperature properties, in particular, improved resistance to thermal stress cracking.

(2) Prior Art

U.S. Pat. No. 3,738,923 describes copolymers of 40 to 60 mole percent of ethylene and from 40 to 60 mole percent of chlorotrifluoroethylene or tetrafluoroethylene. While copolymers of 40 to 60 mole percent of ethylene with 40 to 60 mole percent of tetrafluoroethylene, chlorotrifluoroethylene or mixtures thereof have high melting points, generally in the order of above about 200° C., their use at temperatures above about 150° C. has been severely restricted due to their tendency to stress-crack at such temperatures. At such temperatures they crack under tensile stresses appreciably below the limits of their short-term strength.

U.S. Pat. No. 3,847,881 discloses that the thermal stresscracking characteristics of copolymers of about 40 to 60 mole percent of ethylene with about 40 to 60 mole percent of halogenated comonomers selected from the group consisting of tetrafluoroethylene, chlorotrifluoroethylene and mixtures thereof are improved by incorporating therein from 0.1 to 10 mole percent, based on the moles of halogenated comonomer, of 3,3,3-trifluoro2-trifluoromethylpropene.

U.S. Pat. No. 3,706,723 discloses that thermoplastic 3,3,3-trifluoro-2-trifluoromethylpropene/1,1-difluoroethylene copolymers are prepared by copolymerizing the monomers in liquid media in the presence of a free radical generating initiator. The copolymer products are melt-processable, retain their mechanical strength at high temperatures, and resist attack by corrosive agents and solvents.

U.S. Pat. No. 3,893,987 discloses that terpolymers may be formed by copolymerization of from about 0.1 to 30 mole percent of perhalogenated monomer selected from the group consisting of tetrafluoroethylene, chlorotrifluoroethylene and mixtures thereof, and 3,3,3-trifluoro-2-trifluoromethyl propene/1,1-difluoroethylene copolymer, thereby improving its melt processing characteristics, without seriously deteriorating its good mechanical properties and chemical resistance. However, U.S. Pat. No. 3,893,987 further discloses that attempts to introduce ethylene as a third monomer into the copolymer failed to produce a terpolymer at low ethylene feed levels, but produced only a copolymer of 3,3,3-trifluoro-2-trifluoromethyl propane and ethylene at high ethylene feed levels and produced a terpolymer that decomposed before melting at intermediate ethylene feed levels.

U.S. Pat. No. 4,123,602 discloses that a terpolymer consisting of from 40 to 60 mole % of tetrafluoroethylene, 40 to 60 mole % of ethylene and 0.1 to 10 mole % of perfluoroalkyl vinyl component having the formula:

$$CH_2=CH-C_nF_{2n+1}$$

wherein n is an integer of 2 to 10, may be formed only if, throughout the course of the copolymerization, the molar ratio of $C_2F_4$ to $C_2H_2$ in the reactor is maintained essentially higher than 40 to 60 while keeping the mole % of the perfluoroalkyl vinyl monomer essentially in the range of from 0.1 to 10, based on the total monomer's content.

U.K Patent Application No. 2 084 593A discloses copolymers consisting of 93–99 mole % tetrafluoroethylene units and, complementally, 7–1 mole % fluorinated ($C_2$-$C_{10}$)alkylethylene comonomer units and being characterized by having the units of the copolymer substantially uniformly positioned throughout the copolymer chain. The copolymers of the UK Patent Application are produced by copolymerization process wherein the fluorinated alkyl ethylene is uniformly added to the reaction vessel throughout the polymerization so as to maintain its concentration below 2.5 mole % relative to the tetrafluoroethylene.

U.S. Pat. No. 3,624,250 discloses that the high temperature tensile properties of a copolymer consisting essentially of chlorotrifluoroethylene or tetrafluoroethylene and ethylene are improved by incorporating therein a small amount of a vinyl monomer having the formulae:

$$R-CF_2=CF_2 \text{ or } ROCF=CF_2 \text{ or } R_1CH_2C(X)=CH_2$$
$$\text{or } R_2OCH_2C(X)=CH_2$$

wherein X is H or $CH_3$. While use of vinyl monomers such as $R_1CH_2C(X)=CH_2$, wherein $R_1$ is $CF_3$ or $CF_3CF_2$, and X=H, and perfluoroalkyl ethers ($R_2OCH_2C(X)=CH_2$), wherein $R_2$ is perfluoroisopropyl and X=H is disclosed, working examples are only provided for perfluoroalkene-1 of the general structure $R_1CF=CF_2$ and perfluorooxyl vinyl ethers (ROC-F—$CF_2$).

There is always a need for other comonomers which, when incorporated into copolymers of 40 to 60 mole percent of ethylene with 40 to 60 mole percent of chlorotrifluoroethylene, produce new copolymers of improved resistance to thermal stress-cracking and water vapor permeability and attack by common organic solvents, inorganic acids and bases at elevated temperature, without having significant adverse effect on thermal stability.

SUMMARY OF THE PRESENT INVENTION

In accordance with the present invention, it has surprisingly been discovered that the thermal stress-cracking characteristics of copolymers of ethylene and trifluoroethylene or chlorotrifluoroethylene are improved by incorporating within the copolymer "an effective amount" of one or more perfluoroisoalkoxy perfluoroalkyl substituted ethylene monomers of the formula:

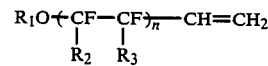

wherein:

n is an integer of from about 2 to about 5;

$R_1$ is perfluoroisoalkyl having from about 3 to about 8 carbon atoms; and $R_2$ and $R_3$ are the same or different, and are fluoro or perfluoroalkyl having from 1 to about 4 carbon atoms.

As used herein "an effective amount" of said perfluoroalkyl substituted ethylene monomer is an amount sufficient to improve the thermal stress-cracking characteristics of copolymers of ethylene and chlorotrifluoroethylene to any extent.

DESCRIPTION OF THE PREFERRED EMBODIMENTS

In its preferred embodiments, this invention provides a novel solid copolymer which comprises (a) from about 40 to about 60 mole percent of chlorotrifluoroethylene or trifluoroethylene;

(b) from about 40 to about 60 mole percent of ethylene; and (c) from about 0.1 to about 10 mole percent of one or more perfluoroisoalkoxy perfluoroalkyl substituted ethylene moieties of the formula:

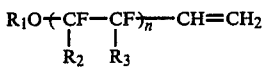

wherein:

n is an integer of from about 2 to about 5;

$R_1$ is perfluoroisoalkyl having from about 3 to about 8 carbon atoms; and $R_2$ and $R_3$ are the same or different, and are fluorine or perfluoroalkyl having from 1 to about 4 carbon atoms.

In these preferred embodiments of the invention, the terpolymer is characterized by having chlorotrifluoroethylene or tetrafluoroethylene-ethyleneperfluoroisoalkoxy perfluoroalkyl ethylene segments randomly distributed throughout alternating chlorotrifluoroethylene or tetrafluoroethylene-ethylene segments.

In the particularly preferred embodiments of this invention, the mole percent of ethylene is from about 45 to about 55, the mole percent of chlorotrifluoroethylene or tetrafluoroethylene is from about 45 to about 55 and the mole percent of said perfluoroalkyl substituted ethylene moiety is from about 0.1 to about 5.0, wherein the perfluoroalkyl substituted ethylene moiety is derived from one or more, (preferably a mixture of) perfluoro ($C_4$ to about $C_8$) isoalkoxy perfluoroalkyl ethylene moiety. Among these particularly preferred embodiments, most preferred are those embodiments in which the mole percent of ethylene is from about 47.5 to about 52.5, the mole percent of chlorotrifluoroethylene or tetrafluoroethylene is from about 47.5 to about 52.5, and the mole percent of said one or more perfluoroisoalkyloxy perfluoroalkyl substituted ethylene moieties is from about 0.1. to about 1.5, wherein the perfluoroisoalkyloxy perfluoroalkyl substituted ethylene moiety is derived from a monomer of the formula:

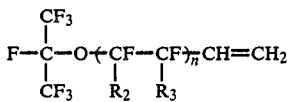

wherein:

n is an integer of about 2 to about 5;

$R_2$ and $R_3$ are the same or different and are fluorine or trifluoromethyl; or said perfluoroisoalkoxy perfluoroalkyl substituted ethylene moiety is derived from a monomer of the formula:

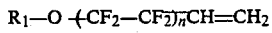

wherein:

n is an integer from about 2 to about 5; and $R_1$ is perfluoroisoalkyl having from about 3 to about 8 carbon atoms.

Especially effacious results have been obtained where the copolymers contain from about 0.1 to about 10 mole percent, preferably from about 0.1 to about 5 mole percent, of a mixture of perfluoroisoalkoxy perfluoroalkyl ethylenes, especially perfluoroisopropoxy perfluoroethylethylene. These embodiments of the invention exhibit superior resistance to thermal stress-cracking at temperatures of about 200° C., low water permeability, resistance to common organic solvents as well as common inorganic alkalis and acids, and significantly increased elongation at high temperatures.

The terpolymers of this invention can be conveniently prepared using conventional polymerization techniques, such as bulk polymerization, emulsion polymerization, solution polymerization or suspension polymerization, which techniques are well known in the art. In such copolymerization procedures, the monomer is effected by contacting the desired concentration of monomer neat or in a suitable liquid polymerization medium in the presence of a free radical generating polymerization initiator. Suitable liquid polymerization media include aqueous media as well as non-aqueous media. Illustrative of suitable non-aqueous media are excesses of one or more of the liquid monomers, or nonpolymerizable organic solvents, such as those perfluorinated and perchlorofluorinated hydrocarbons containing up to about 10 carbon atoms which are liquid at the chosen polymerization temperature, and especially those perfluorinated and perchlorofluorinated alkanes of up to about 6 carbon atoms having melting points below about 80° C., and saturated perfluorocyclic ethers. A partial listing of organic solvents suitable for use as liquid polymerization media includes perfluorocyclobutane, pentachlorofluoroethane, trichlorotrifluoroethane, 1,1,2,2,-tetrachloro-1,2-difluoroethane, perfluoro-n-butane, perfluoro-n-pentane, trichlorofluoromethane, dichlorofluoromethane, dichlorodifluoromethane, 1,2-dichloro-1,1,2,2-tetrafluoroethane, and the like, the 3,3,3-trifluoro-2-trifluoromethyl propene monomer and octafluorocyclobutane being most preferred.

Suitable free radical generating polymerization initiators include organic peroxy compounds such as the well known aliphatic and aromatic peroxy compounds, including the fluorine and chlorine substituted organic peroxides, as for example, 2,4-dichlorobenzoyl peroxide, t-butylperoxypivalate, pelargonul peroxide, decanoyl peroxide, bis-trichloroacetyl peroxide, lauroyl peroxide, propionyl peroxide, acetyl peroxide, trifluoroacetyl peroxide, trichloroacetyl peroxide, perfluoropropionyl peroxide, succinic acid peroxide, t-butyl peroxyisobutyrate, t-butyl-peroxy maleic acid, 1-hydroxy-1'-hydroperoxy dicyclohexyl peroxide, bis(1-hydroxycyclohexyl) peroxide, 2,5-dimethy-hexane-2,5-diperbenzoate, t-butyl diperphthalate, t-butyl perbenzoate, n-butyl-4,4-bis(t-butylperoxy)valerate, ketone peroxide, 2,5-dimethyl-2,5-bis(t-butyl peroxy)hexane, di-t-butyl peroxide, 2,5-dimethyl-2,5-bis(t-butyl peroxy)hexyne-3; organic azonitrile compounds such as azobisisobutyronitrile, 2,2'-azo-bis-2,4-dimethylvaleronitrile, and 2,2'-azo-bis-2,3,3-trimethylbutyronitrile; peroxidic esters such as di-iso-propyl peroxydicarbonate, and others. Although the above-described free radical initiating polymerization initiators are especially suitable for making the copolymers of the present invention by copolymerizing the monomers using as liquid reaction medium one or more of the monomer per se, or using organic solvents as above described, they may also be used for carrying out the copolymerization in aqueous media in the presence or absence of emulsifying and/or suspending agents.

When the copolymerization is to be carried out in the presence of an aqueous medium, and, especially, in aqueous emulsion, there may additionally be used as free radical generating polymerization initiator water-soluble peroxides such as hydrogen peroxide, barium peroxide and sodium peroxide; persulfate, perphosphate and perborate salts of, e.g., sodium, potassium, calcium, barium and ammonium; and organic hydroperoxides such as cumene hydroperoxide or t-butyl hydroperoxide. These water-soluble free radical generating polymerization initiators may be used in conjunction with suitable reducing agents which act as catalyst activators, such as alkali metal bisulfites, alkali metal formaldehyde sulfoxylates, or sulfur dioxide. If desired, the above-described types of water soluble free radical generating polymerization initiators may be used in conjuction with known accelerators therefor, such as silver salts, for example, silver nitrate or silver nitrite, ferrous sulfate, ferrous nitrate, and others.

Generally, the initiator will be employed in amounts of about 0.003 to about 3 percent, usually about 0.02 to about 1 percent by weight, based on the monomer charge. The initiator may be added initially, or, in order to maintain desired polymerization rates, intermittently or continuously throughout the polymerization.

Copolymerization may also be initiated or catalyzed by active radiation, as may, for example, be provided by ultraviolet light γ-rays and the like. The copolymerization reaction process is preferably in an aqueous suspension employing suitable emulsifying and/or suspension agents using a suitable azo or peroxide catalyst dissolved in a non-tetogenic solvent, as for example the halocarbon described above. In this particularly preferred embodiment, bis-trichloroacetyl peroxide is the initiator of choice and 1,1,2-trichloro-1,2,2-trifluoroethane is the solvent.

Emulsification and/or suspension agents suitable for use in carrying out the copolymerization in aqueous emulsions or suspensions include the emulsifying agents customarily employed in emulsion polymerization of polymerizable ethylenically unsaturated organic compounds, such as alkali metal soaps of higher fatty acids, as for example potassium, ammonium or sodium myristate, laurate, palmitate, oleate or stearate; the alkali metal or ammonium alkyl or alkylene sulfates or sulfonates, such as, e.g., sodium and/or potassium, lauryl or decyl sulfate, cetyl and stearyl sulfonate; but especially the well-known polyfluorinated carboxylic acid emulsifying agents, such as perfluorooctanoic acid, and their alkali metal and ammonium salts. The suspending and emulsifying agents may be employed within wide ranges of concentration known to those of skill in the art, but are ordinarily employed in amounts ranging from about 0.05 to about 5, preferably in amounts ranging from about 0.1 to about 2 percent by weight, based on the weight of the aqueous medium.

Polymerization temperatures and pressure are not critical and can be varied widely. The copolymerization may be carried out at temperatures within the range of from about $-80°$ to about 300° C., is preferably carried out at temperatures in the range of from $-20°$ to about 100° C., and more preferably, at temperatures within the range of from about $-15°$ to about 80° C. When the copolymerization is to be conducted in an aqueous medium, the polymerization temperature is usually not lower than about 0° C. In any event, copolymerization in accordance with the present invention is carried out at temperatures above those at which the liquid polymerization medium employed will solidify, and the choice of copolymerization temperature will largely be governed by the desired decomposition rate at a given temperature of the particular initiator or initiator system employed. The copolymerization may be carried out at any desired pressure, pressures from about subatmospheric to super-atmospheric can be used, but it is suitably conducted at pressures ranging from about atmospheric to about 500 psig for reasons of economy in equipment design, the copolymerization conditions. The copolymerization may also be conducted under superimposed pressures, as obtained by charging the polymerization zone with a gas, such as nitrogen.

If desired, the molecular weight of the copolymer product may be varied or controlled by inclusion in the polymerization recipe of one or more of the well-known chain transfer agents or chain transfer solvents. A preferred agent is chloroform. Recovery of the copolymer product from the polymerization medium follows conventional procedure. When the reaction is carried out in one of the organic solvents as hereinabove defined, or in aqueous suspension, the copolymer product is generally obtained as a white granular powder which can be readily separated from the reaction medium by conventional methods, such as gassing off the excess monomers and low boiling solvents. When the copolymerization is carried out in aqueous emulsion, the copolymer product is generally obtained as latex and may be recovered in conventional manner by first coagulating the latex, and then separating the coagulated product by filtration. Coagulation of the latex may be effected by methods well known to those skilled in the art, for example, by addition of electrolytes, by agitation, sonic vibration, and the like. In any event, the copolymer product after separation from the reaction medium id ordinarily washed with suitable solvents, e.g., methanol, to remove catalyst residues.

The chlorotrifluoroethylene, tetrafluoroethylene, and ethylene monomer used in the preparation of the copolymers of this invention are known compounds which can be obtained from commercial sources or prepared in accordance with known techniques. Useful perfluoroiso-alkoxy perfluoroalkyl ethylene monomer can also be obtained from commercial sources or prepared in accordance with known techniques. For example, these monomers can be conveniently derived from perfluoroketones by converting the ketones into the corresponding telogen perfluoroisoalkoxy ethyliodide, followed by telomerization with an appropriate olefin followed by addition of ethylene and finally dihydroiodation to the desired perfluoroisoalkoxy-perfluoroalkyl ethylene. These procedures are described in more detail in R.N. Haszeldine, *J. Chem. Sol.*, 4291 (1955) and U.S. Pat. Nos. 3,514,487, 3,453,333, 3,577,465, 3,106,589 and references cited therein, all of which are incorporated herein by reference.

Various other optional ingredients, which are normally included in polymer compositions, may be added to the terpolymer of this invention at an appropriate time. Such optional components include fillers, plasticizers, impact modifiers, colorants, mold release agents, antioxidants, ultraviolet light stabilizers, lubricants, antistatic agents, fire retardants, and the like. These optional components are well known to those of skill in the art, and accordingly will not be described herein in detail.

Terpolymers of this invention are characterized by improved thermal properties and a resistance to thermal stress cracking as compared to other conventional halocarbons. Thus, they are extremely useful in high temperature applications such as insulation coatings for wire exposed to temperatures in the range of up to about 180° C.

The following specific examples are presented to illustrate the invention in detail and should not be construed as a limitation thereon.

EXAMPLE I

Preparation of Perfluoroisopropoxy Perfluorobutyl Ethylene

Into a 300ml 3-necked flask, equipped with a short distillation column, distillation head, stirrer, and thermometer were placed 216 g (0.4 mole) of 1-perfluoroisopoxy-1, 1,2,2,3,3,4,4,-octafluoro-6-iodohexane and 81.55 g (0.44 mole) of tri-n-butylamine. Applying a nitrogen atmosphere, the mixture was heated to about 150°–155° C. (liquid phase). Heat-up time was about 45 minutes. After about 15 minutes at this temperature refluxing of a clear liquid commenced, followed by distillation at about 130° C. (127°–135° C.). Distillation ceased after 3 hours. A total of 167 g of crude, somewhat turbid, distillate was collected. This material was subsequently purified by fractional distillation employing a spinning band column. At a pressure of 67 mm Hg, 135.2 g distilled at 57° C. For this fraction GC/MS analysis indicated a purity in excess of 99%. (A possible trace impurity could be the corresponding ethane derivative $F_7C_3O(CF_2)_4CH_2CH_3$).

EXAMPLES II TO IV

Preparation of Copolymers of Chlorotrifluoro-ethylene/Ethylene/Perfluoroisopropoxy Perfluorobutyl Ethylene Procedure:

A 1-1 Parr Bomb reactor fitted with a 6.35 cm dia. impeller, a spiral cooling coil, a $0–3.55 \times 10^3$ KPa pressure gauge, thermocouple well, feed and discharge ports was used as polymerization reactor. Feed and discharge ports were fitted with needle and check valves. Feed vessels for ethylene gas, liquified chlorotrifluoroethylene, gas, methanol/chloroform/perfluoroisopropoxy perfluorobutyl ethylene (POF4E) monomer mixtures, and bis-trichloroacetyl peroxide (TCAP) catalyst in 1,1,2-trifluoro-1,2,2-trichloroethane solvent were fitted with high pressure tubing, gauges, and valves. A 3.785 L vessel was used to collect the unreacted fluoromonomers when the polymerization was terminated. A large metal dewar was used for chilling the above vessel to −78° C. (dry ice/acetone). The reactor, its auxiliary equipments, and all feed vessels were constructed of #316 stainless steel. The reaction was stirred at 1000 rpm by an impeller driven by a "V" belt between pulleys on the shaft of an explosion proof motor and the reactor shaft. A cooling unit was connected in series with the internal spiral cooling coil of the reactor to control the reaction temperature. The reactor base was placed in a cooling bath whose temperature was maintained with another cooling unit.

The 1 liter reactor was charged with 300 mL of distilled water, cooled to +10° C., then pressurized with nitrogen to $\sim 2.0 \times 10^3$ kpa. When sealed against leaks, the nitrogen was vented and the reactor pressure reduced with a vacuum pump to $6.9 \times 10^2$ Pa. A mixture of 84 mL of methanol, 1.1 mL of chloroform, and 6.75 g of perfluoroisopropoxy perfluorobutyl ethylene (POF4E) monomer were put into a previously evacuated 150 mL feed vessel and pressurized to 0.21 KPa with nitrogen. The feed vessel was connected to the reactor. All feed lines were flushed with nitrogen and the pressurized contents of the feed vessel allowed to enter the reactor. An evacuated, weighed, 250 mL feed vessel was chilled to −40° C. and charged with 150 g of chlorotrifluoroethylene (CTFE) gas. The feed vessel was connected to the reactor and all lines were purged with nitrogen. The feed vessel was warmed to 50° C. and the CTFE fed into the reactor which was kept under reduced pressure. The reactor was then pressurized with ethylene gas to $2.0 \times 10^3$ kPa through a controlling inline gas regulator. Stirring was initiated. The reactor and its contents were maintained at +10° C. 0.3 g of bis-trichloroacetyl peroxide (TCAP) catalyst were added to 20 mL of G-113 previously chilled to −25° C. This diluted catalyst mixture was put into a previously evacuated 40 mL feed vessel chilled to −25° C. It was then pressurized to $3.9 \times 10^3$ kPa with nitrogen and connected to the reactor. All feed lines were flushed with nitrogen and the diluted catalyst solution was permitted to enter the reactor. Ethylene gas was always available upon demand. As the polymerization progressed and ethylene gas was consumed, more gas entered the reactor through the in-line regulator. The polymerization was terminated after less than 8% monomer conversion in order that an essentially constant monomer feed ratio was maintained. The reaction was terminated by addition of 0.04 g of hydroquinone in 75 mL of methanol via a pressurized feed vessel. The ethylene feed was stopped. The reaction pressure was quickly reduced by passing the reactor gasses first through molecular sieve to trap entrained water and then into a large CTFE trap chilled in a dry ice/acetone dewar. The CTFE and F6E condensed and the ethylene gas was permitted to escape into the atmosphere. The reactor was swept free of CTFE and F6E with nitrogen prior to opening the reactor. The polymer was washed in a Waring Blender with methanol, filtered, and then dried in a vacuum oven at 80° C. for 24 hours.

The melting point of the copolymer was determined by differential scanning colorimeter. The reaction parameters and reaction products are set forth in the following Table I.

TABLE I

| Example. No. | Polymer Composition | | | Polymer Point °C. (DSC) |
|---|---|---|---|---|
| | CTFE Mole % | Ethylene Mole % | POF4E Mole % | |
| II | 48.43 | 50.38 | 1.67 | 227 |
| III | 48.40 | 50.07 | 0.91 | 231 |

TABLE I-continued

| Example. No. | Polymer Composition | | | Polymer Point °C. (DSC) |
|---|---|---|---|---|
| | CTFE Mole % | Ethylene Mole % | POF4E Mole % | |
| IV | 48.58 | 49.56 | 1.99 | 218 |

COMPARATIVE EXAMPLE 1

A series of experimetns were conducted to demonstrate the criticality of the specific combination of monomers used in the preparation of the copolymer of this invention to the superior thermal properties of the copolymer as compared to known copolymers. More particularly, the thermal characteristics of various copolymers not within the scope of the invention were compared with the same thermal properties of the copolymers of EXAMPLES I to IV.

The test was the Bent-Strip Test which was performed on film strips 0.38 mm (0.015 in.) thick, 6.35 mm (0.25 in.) wide, and 76.2 mm (3 in.) long. They were cut from sheets obtained by compression molding a weighed amount of polymer granules between silicon coated aluminum plates within an aluminum spacer frame at temperatures of about 15° C. above the polymer melting point. The molding process entailed applying first pressure between 500 kg to 2000 kg for one minute and then 2000 kg for two minutes in a preheated press, followed by cooling in a cool press at 7000 kg pressure. Each film strip was bent over a stainless steel rod of 7.94 mm (5/16 in.) diameter. The ends were aligned and secured together at a constant length in the platens of a clamp with parallel jaws applying a torque of about 4.5 kg.

After attaching an additional load to the clamping device such that the total weight amounted to 200 g, each clamped specimen was placed on a 6.35 mm (0.25 in.) diameter stainless steel rod mounted in an oven in which a temperature of 180°±2° C. was maintained.

Though any known control device may be used to indicate sample failure, a simple signalling device for recording each sample fracture and the time of its occurrence was constructed using an Iron-Constantane thermocouple wire. A normal thermocouple junction was formed by welding the junction of the iron and constantane wires. To form a switch, one wire was cut which opens the circuit. A clip was fastened to each end of the cut wire. One clip was attached to the oven floor and the other clip to the sample clamp. The thermocouple was attached to one of the 12 positions of a temperature recorder. Since the sample is non-conducting, no signal flows while the sample is intact and the sample clamp is without contact with the oven floor. Therefore, the recorder registers off scale for that particular thermocouple position. When the sample fails, the clamp touches the oven floor and thereby completes the circuit, the thermocouple now measures the oven temperature and the recorder registers both the thermocouple number and the temperature. The time of failure is determined from the position of the marks on the chart speed. Conventional copolymers employed in the tests are as follows:

(a) H-1 is a conventional copolymer of 2.22 mole percent hexafluoroisobutylene, 49.49 mole percent ethylene and 50.52 mole percent of chlorotrifluoroethylene;

(b) H-2 is a conventional copolymer of 50.52 mole percent of chlorotrifluoroethylene and 49.48 mole percent of ethylene.

The test results are expressed as "TFR", which is the ratio of the time to failure of the copolymer of this invention to the time to failure of the conventional polymer to which it is being compared. The results of these tests are set forth in the following Table II.

TABLE II

| Expt. No. | Copolymer Composition (Ex. No.) | Bent Strip Test | |
|---|---|---|---|
| | | TFR | |
| | | H-1 | H-2 |
| 1 | II | 15 | 250 |
| 2 | III | 4.5 | 713 |
| 3 | IV | 14 | 240 |

We claim:

1. A solid copolymer of from about 40 to 60 mole percent of chlorotrifluoroethylene or tetrafluoroethylene from about 40 to 60 mole percent of ethylene and an effective amount of one or more perfluoroisoalkoxy perfluoroalkyl ethylenes having the formula:

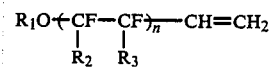

wherein:

n is an integer of from about 2 to about 5;

$R_1$ is perfluoroisoalkyl having from about 3 to about 8 carbon atoms;

$R_2$ and $R_3$ are the same or different and are fluorine or perfluoroalkyl having from 1 to about 4 carbon atoms; and an effective amount is an amount sufficient to improve the thermal stress-cracking characteristics of copolymers of ehtylene and chlorotrifluoroethylene.

2. The solid copolymer of claim 1 wherein $R_2$ and $R_3$ are the same or different and are fluorine or trifluoromethyl.

3. The solid copolymer of claim 2 wherein $R_2$ and $R_3$ are fluorine.

4. The solid copolymer of claim 1 wherein chlorotrifluoroethylene or tetrafluoroethylene/ethylene/perfluoroisoalkoxy perfluoroethylene segments are randomly distributed throughout alternating chlorotrifluoro- or tetrafluoroethylene/ethylene segments.

5. The solid copolymer of claim 1 wherein about 45 to about 55 mole percent of chlorotrifluoroethylene, about 45 to about 55 mole percent of ethylene and about 0.1 to about 5 mole percent of at least one perfluoroisoalkoxyperfluoroalkylethylene is used.

6. The solid copolymer of claim 1 therein said copolymer contains a mixture of perfluoroisoalkoxyperfluoroalkylethylenes wherein n is 2, 3 or 4.

7. The solid copolymer of claim 1 wherein $R_1$ is perfluoroisoalkyl having from about 3 to about 5 carbon atoms.

8. The solid copolymer of claim 7 wherein $R_1$ is trifluoromethyl.

9. A solid copolymer of from about 40 to 60 mole percent of chlorotrifluoroethylene, from about 40 to 60 mole percent of ethylene and from about 0.1 to about 10 mole percent of at least one perfluoroisopropoxyperfluoroalkylethylene having the formula:

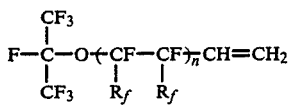

wherein n is an integer of 2 to 5 and wherein $R_f$ is the same or different at each occurrence and is fluorine or trifluoromethyl.

10. The solid copolymer of claim 9 wherein $R_f$ is fluorine.

11. The solid copolymer of claim 9 wherein said copolymer contains a mixture of perfluoroisopropoxyperfloroalkylethylenes wherein n is 2, 3 or 4.

12. The solid copolymer of claim 9 of about 47.5 to about 52.5 mole percent of chlorotrifluoroethylene, from about 47.5 to about 52.5 mole percent of ethylene and from about 0.1 to about 1.5 mole percent of at least one perfluoroisopropoxyperfluoroalkylethylene having the formula:

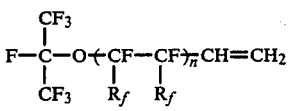

wherein n is an integer of from about 2 to about 5 and wherein $R_f$ is the same or different at each occurrence and is fluorine or trifluoromethyl.

13. The solid copolymer of claim 12 wherein said copolymer cotains a mixture of perfluoroisopropoxyperfloroethylene wherein n is 2, 3 or 4.

14. The solid copolymer of claim 13 wherein $R_f$ is fluorine.

15. A solid copolymer of about 40 to about 60 mole percent of tetrafluoroethylene, from about 40 to about 60 mole percent of ethylene and from about 0.1 to about 10 mole percent of at least one perfluoroisopropoxyperfluoroalkylethylene having the formula:

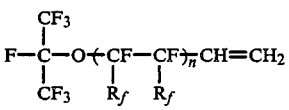

wherein n is an integer of from about 2 to about 5 and wherein $R_f$ is the same or different at each occurrence and is fluorne or trifluoromethyl.

16. The solid copolymer of claim 15 wherein $R_f$ is fluorine.

17. The solid copolymer of claim 15 wherein said copolymer contains a mixture of perfluoroisopropoxyperfloroalkylethylenes wherein n is 2, 3 or 4.

18. The solid copolymer of claim 15 of about 47.5 to about 52.5 mole percent of tetrafluoroethylene, from about 47.5 to about 52.5 mole percent of ethylene and from about 0.1 to about 1.5 mole percent of at least one perfluoroisopropoxyperfluoroalkylethylene having the formula:

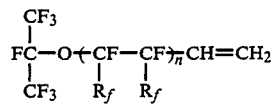

wherein n is an integer of from about 2 to about 5 and wherein $R_f$ is the same or different at each occurrence and is fluorine or trifluoromethyl.

19. The solid copolymer of claim 18 wherein said copolymer contains a mixture of perfluoroisopropoxyperfluoroalkylethylenes wherein n is 2, 3 or 4.

20. A solid copolymer which comprises:
(a) from about 40 to about 60 mole percent of chlorotrifluoroethylene or trifluoroethylene;
(b) from about 40 to about 60 mole percent of ethylene; and
(c) from about 0.1 to about 10 mole percent of one or more perfluoroisoalkoxy perfluoroalkyl substituted ethylene moieties of the formula;

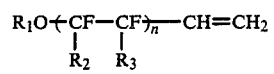

wherein:
n is an integer of from about 2 to about 5;
$R_1$ is perfluoroisoalkyl having from about 3 to about 8 carbon atoms; and
$R_2$ and $R_3$ are the same or different, and are fluorine or perfluoroalkyl having from 1 to about 4 carbon atoms.

21. A polymer according to claim 20 which comprises:
(a) from about 40 to about 60 mole percent of chlorotrifluoroethylene;
(b) from about 40 to about 60 mole percent of ethylene; and
(c) from about 0.1 to about 10 mole percent one or more perfluoroisoalkoxy perfluoroalkyl substituted ethylene moieties of the formula;

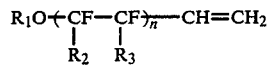

wherein:
n is an integer of from about 2 to about 5;
$R_1$ is perfluoroisoalkyl having from about 3 to about 8 carbon atoms; and
$R_2$ and $R_3$ are the same or different, and are fluorine or perfluoroalkene having from 1 to about 4 carbon atoms.

* * * * *